United States Patent
Miyazaki et al.

(10) Patent No.: US 8,231,173 B2
(45) Date of Patent: Jul. 31, 2012

(54) ARMREST WITH CUP HOLDER

(75) Inventors: Seiichiro Miyazaki, Akishima (JP); Takahiko Suzuki, Akishima (JP)

(73) Assignee: Tachi-S Co., Ltd, Tokyo (JP)

(*) Notice: Subject to any disclaimer, the term of this patent is extended or adjusted under 35 U.S.C. 154(b) by 212 days.

(21) Appl. No.: 12/411,733

(22) Filed: Mar. 26, 2009

(65) Prior Publication Data
US 2010/0244507 A1 Sep. 30, 2010

(51) Int. Cl.
*A47C 7/62* (2006.01)
*B60N 2/46* (2006.01)

(52) U.S. Cl. ............... 297/188.14; 297/411.46
(58) Field of Classification Search ............. 297/188.14, 297/411.46
See application file for complete search history.

(56) References Cited

U.S. PATENT DOCUMENTS

| | | | |
|---|---|---|---|
| 3,833,260 A * | 9/1974 | Harder, Jr. | 297/452.51 |
| 4,099,772 A * | 7/1978 | Barecki | 297/220 |
| 5,592,688 A * | 1/1997 | LaRonge et al. | 2/19 |
| 5,816,660 A * | 10/1998 | Johnson et al. | 297/452.38 |

FOREIGN PATENT DOCUMENTS

JP 2005-013622 A 1/2005

* cited by examiner

*Primary Examiner* — David Dunn
*Assistant Examiner* — Philip Gabler
(74) *Attorney, Agent, or Firm* — Browdy and Neimark, PLLC

(57) ABSTRACT

An armrest with cup holder is disclosed, in which the cup holder is secured in the upper surface thereof, and that upper surface is covered with an upper cover section of trim cover assembly. Localized portions of the afore-said upper cover section, which lie between a flange of the cup holder and a lateral wall of the armrest, are each formed with an extension in the free end thereof. That extension is folded together with the corresponding end of the upper cover section and retained between the flange of cup holder and a support member provided around the flange of cup holder, thereby making protrudent the localized portions to compensate for and eliminate an objectionable recessed areas between those localized portions and cup holder flange.

2 Claims, 3 Drawing Sheets

ARMREST WITH CUP HOLDER

BACKGROUND OF THE INVENTION

1. Field of the Invention

The present invention relates to an armrest for use with an automotive seat, and in in particular to an armrest of this kind which is provided with a cup holder for receiving and holding a cup or container therein.

2. Description of Prior Art

As shown in FIG. 1 to 3 for example, there has been known an armrest (AR) provided with a cup holder (1) in the upper surface thereof. The cup holder includes a flange (11).

FIGS. 2 and 3 show a cross-sectional view illustrative of structure of the armrest (AR). It is seen therefrom that a foam padding (4) is provided therein, which has a bore receiving a cup holder (1) having a flange (11), wherein the opened side of the cup holder (1) as well as the flange (11) are situated on the upper surface side (at 2') of the armrest, and that a trim cover assembly covers substantive whole outer surfaces of the foam padding (4), except that an opening is defined in the trim cover assembly around the cup holder receiving bore of the foam padding (4) in which the cup holder (1) is received.

Designations (2) and (3) denote an upper cover section and a pair of lateral cover sections, respectively, which are associated with the trim cover assembly.

Designations (5) denote support members fixedly provided in the foam padding (4) adjacent to the peripheral areas of the cup holder receiving bore stated above. The support members (5) are disposed under the flange (11) of the cup holder (1).

Designations (2') denote localized connecting portions of the upper surface cover section (2) of the trim cover assembly. The free ends of such localized connecting portions (2') extend beneath the cup holder flange (11) towards the lateral surfaces of the cup holder (1) and are also retained between that cup holder flange (11) and the support members (5).

As shown, each of the two lateral cover sections (3) is formed by a lamination of top cover member (31) and foam wadding (32). Likewise, the afore-said localized connecting portions (2') is formed by a lamination of top cover member (21') and foam wadding (22'). It is best seen in FIG. 3 that each of the two lateral cover sections (3) has a folded end portion, whereas likewise, each of the localized connecting portions has a folded end portion, and that such folded end portions of lateral cover sections (3) are sewn, by sewing threads (202), with the folded end portions of localized securing portions (2), respectively.

As constructed above, it is possible to keep the localized connecting portions (2') of the trim cover assembly in an evenly stretched state so as to avoid creation of objectionable creases and loosely stretched portions therein, thereby improving an outer aesthetic appearance of armrest (AR).

However, the aforementioned conventional armrests have been with the problem that an objectionable recessed area (H) is created between the cup holder flange (11) and localized connecting portions (2') of trim cover assembly. This problem is due to fact that the free ends of the localized connecting portions (2') are not sufficiently collapsed by and between the cup holder flange (11) and the support member (5), so that the localized connecting portions (2') is not made protruding upwardly towards the peripheral of the flange (11) enough to compensate for and eliminate the recessed area (H).

To solve such problem, it can be considered that the support member (5) may be raised at a point near to the peripheral end of the cup holder flange (11) to make the localized connecting portions (2') protrudent around the peripheral edge of that flange (11) in an attempt to compensate for and eliminate the recessed area (H). But, in that case, the flange (11) will be displaced upwardly, which will impair the outer appearance of the armrest.

On the other hand, to attain improvement of outer aesthetic appearance of armrest for example, the Japanese Laid-Open Patent Publication No. 2005-13622 (hereinafter JP'622) teaches provision of a support plate in localized areas of armrest which surround a cup holder But, according to such armrest, such localized areas of the upper cover section of trim cover assembly, which are defined between the flange of cup holder and the lateral cover sections of trim cover assembly, are so extremely narrow that the above-described type of armrest, to which the present invention is related, can never be applied to this particular armrest of the JP'622. The reason therefor is that, if the above-described type of armrest is applied to this JP'622, the support member (5) will contact the support plate of the JP-622 to generate an objectionable or unpleasant noise.

SUMMARY OF THE INVENTION

In view of the above-stated drawbacks, it is a purpose of the present invention to provide an improved armrest with cup holder, which effectively avoids the creation of the aforementioned objectionable recessed areas.

In order to achieve such purpose, an armrest with cup holder in accordance with the present invention is basically comprised of;

a foam padding having an upper surface and a bore formed in said upper surface;

a support member fixedly provided to said foam padding so as to surround said bore;

a trim cover assembly covering said foam padding, excepting said bore of the foam padding, said trim cover assembly being formed by a foam wadding and a top cover member laminated on said foam wadding;

said trim cover assembly including:

an upper cover section covering said upper surface of said foam padding;

localized connecting portions defined in said upper surface of the trim cover assembly at points corresponding to said bore of the foam padding; said localized connecting portions each having an end; and a pair of lateral cover sections covering a pair of lateral walls of said foam padding, respectively; and an extension defined integrally in said end of each of said localized connecting portions; and said end of each of said localized connecting portions being folded and sewn together with said extension to provide a folded end portion in each of said localized connecting portions, wherein said cup holder is received in said bore of said foam padding, such that said folded end portion of each of said localized connecting portions is sandwiched and retained between said flange of said cup holder and said support member.

Preferably, a foam wading extension may be formed integrally in said foam wadding so as to extend outwardly from said end of each of said localized connecting portion, and said end of each of said localized connecting portions being folded and sewn together with said foam wadding extension to provide a folded end portion in each of said localized connecting portions. In this mode, when the cup holder is received in said bore of said foam padding, said folded end portion of each of said localized connecting portions is sandwiched and retained between said flange of said cup holder and said support member.

Other various features and advantages will become apparent from reading of the description, hereinafter, with reference to the accompanied drawings.

DETAILED DESCRIPTION OF PREFERRED EMBODIMENT OF THE INVENTION

Figure 1:
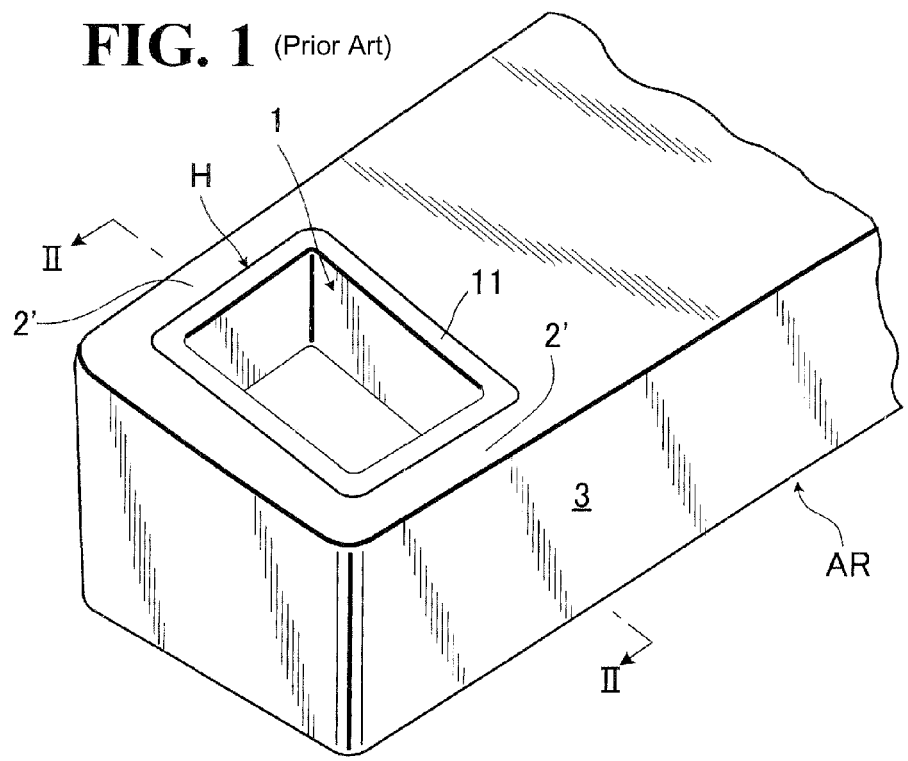
FIG. 1 is a partly broken perspective view showing a conventional armrest with cup holder.
Figure 2:
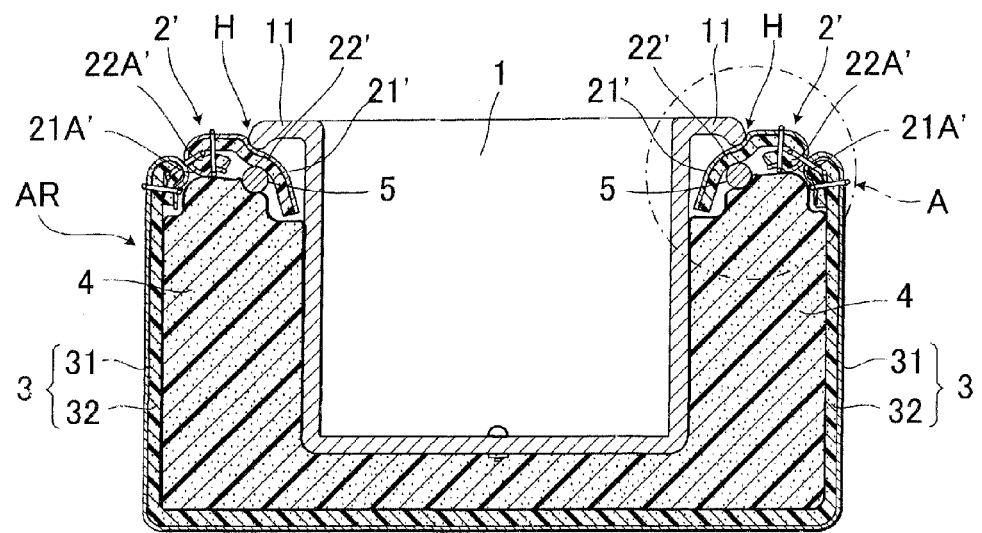
FIG. 2 is a sectional view taken along the line II-II in the FIG. 1.
Figure 3:
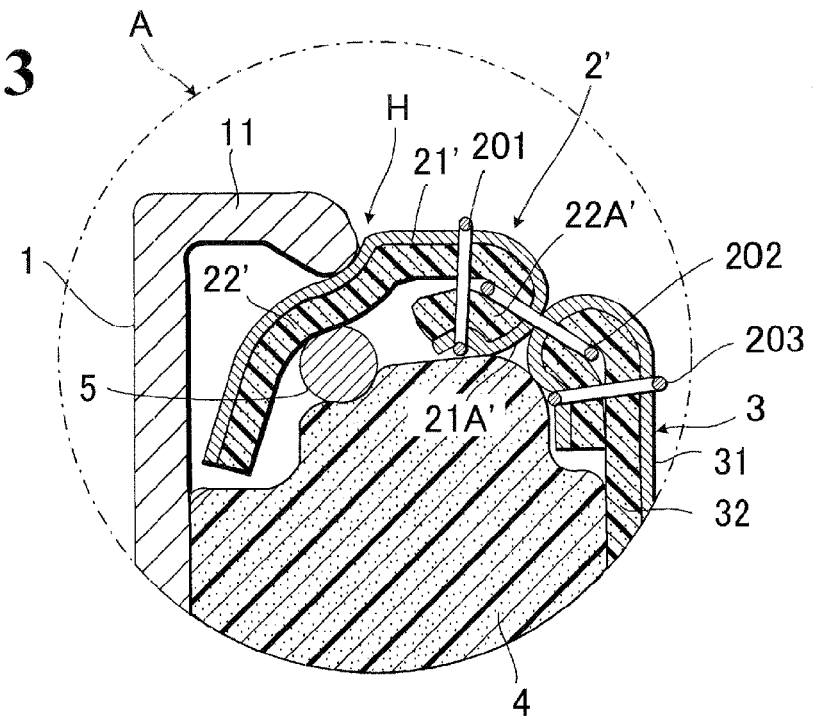
FIG. 3 is an enlarged view showing the local portion of the armrest corresponding to the region encircled by A in the FIG. 2.

At first, it should be understood that FIGS. 1 to 3 shows a conventional armrest which has been described in the foregoing description of prior art, but, since the present invention is based on such conventional armrest, the armrest (AR) of the present invention uses most of the constituent elements stated in the description of prior art above, the description hereinafter will be made of the armrest (AR) of the present invention, with reference to those FIGS. 1 to 3 as well as to FIGS. 4 and 5.

Therefore, it should be understood that all like designations given in the conventional armrest described with reference to the FIGS. 1 to 3 correspond to all like designations to be used hereinafter with reference to the FIGS. 4 and 5.

Figure 4:
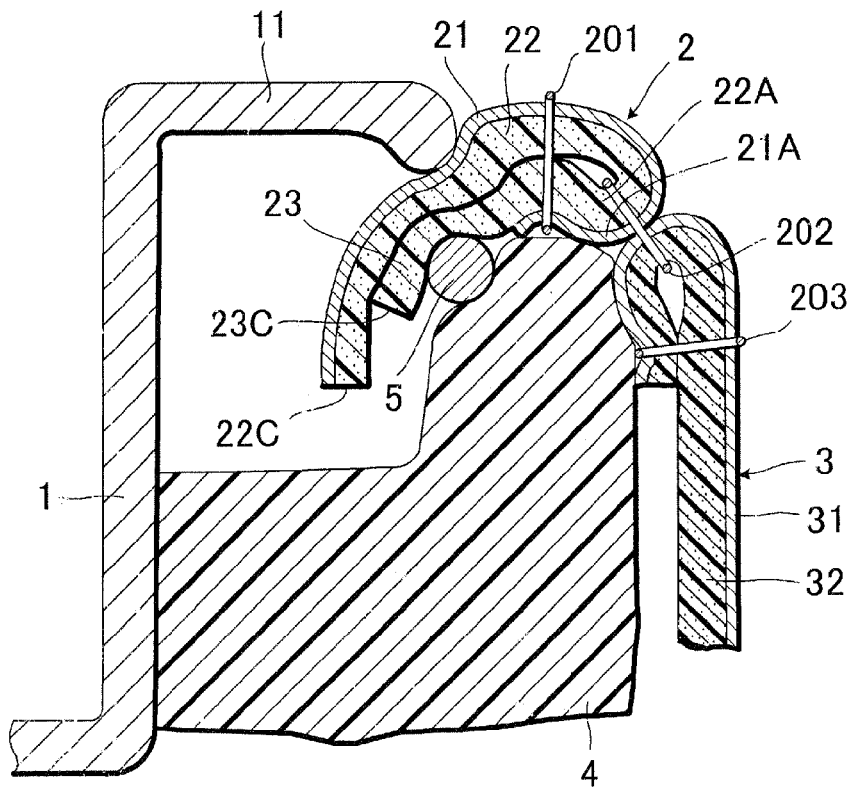
FIG. 4 is a fragmentary enlarged view showing a principal part of an armrest in accordance with the present invention.

FIG. 4 shows a principal part of the armrest (AR) in accordance with the present invention. In brief, according to the present invention, a comparative review of FIGS. 3 and 4 indicates that an extension of foam wadding (23) is provided integrally in the end of lateral cover section (3) and such foam wadding extension (23) is inserted in and retained between the localized connecting portion (2) and the support member (5). Thus, it is to be seen that such localized connection portion (2) is different from the localized connection portion (2') of the conventional armrest, as will be understood from the description, hereinafter. As shown, the foam wadding extension (23) is formed by extending only the foam wadding (22) which is identical to the foam wadding (22') of the conventional armrest.

As similar to the conventional armrest, each of the localized connecting portions (2) defined in the upper cover section of trim cover assembly, which corresponds to the one (2') of the conventional armrest, has a folded end region as understandable from FIG. 4, wherein such folded end region is formed by folding the end portion of the localized connecting portion (2) and sewing the top cover member (21) and the foam wadding (22) together by sewing thread (201). This folded end region of the localized connecting portion (2) is sewn, by a sewing thread (202) with the folded end region of the lateral cover section (3) of trim cover assembly.

In the foregoing folded end region, according to the present invention, the folded foam wadding portion (22A), which underlies the associated foam wadding (22), is formed integrally with the foam wadding extension (23). As shown, the foam wadding extension (23) extends to such an extent of being sandwiched and retained between the support member (5) and a local region of the wadding (22) corresponding to the distal end of the flange (11) of cup holder (1).

It is noted that, instead of the foregoing foam wadding extension (23), the end of the localized connecting portions (2) of the two-layered trim cover assembly, which consists of the top cover member (21) and foam padding (22), may be simply extended in an appropriate length as stated above to form an extension equivalent to that foam wadding extension (23), and such extension be folded as described above and retained between the support member (5) and the cup holder flange (11).

Figure 5:
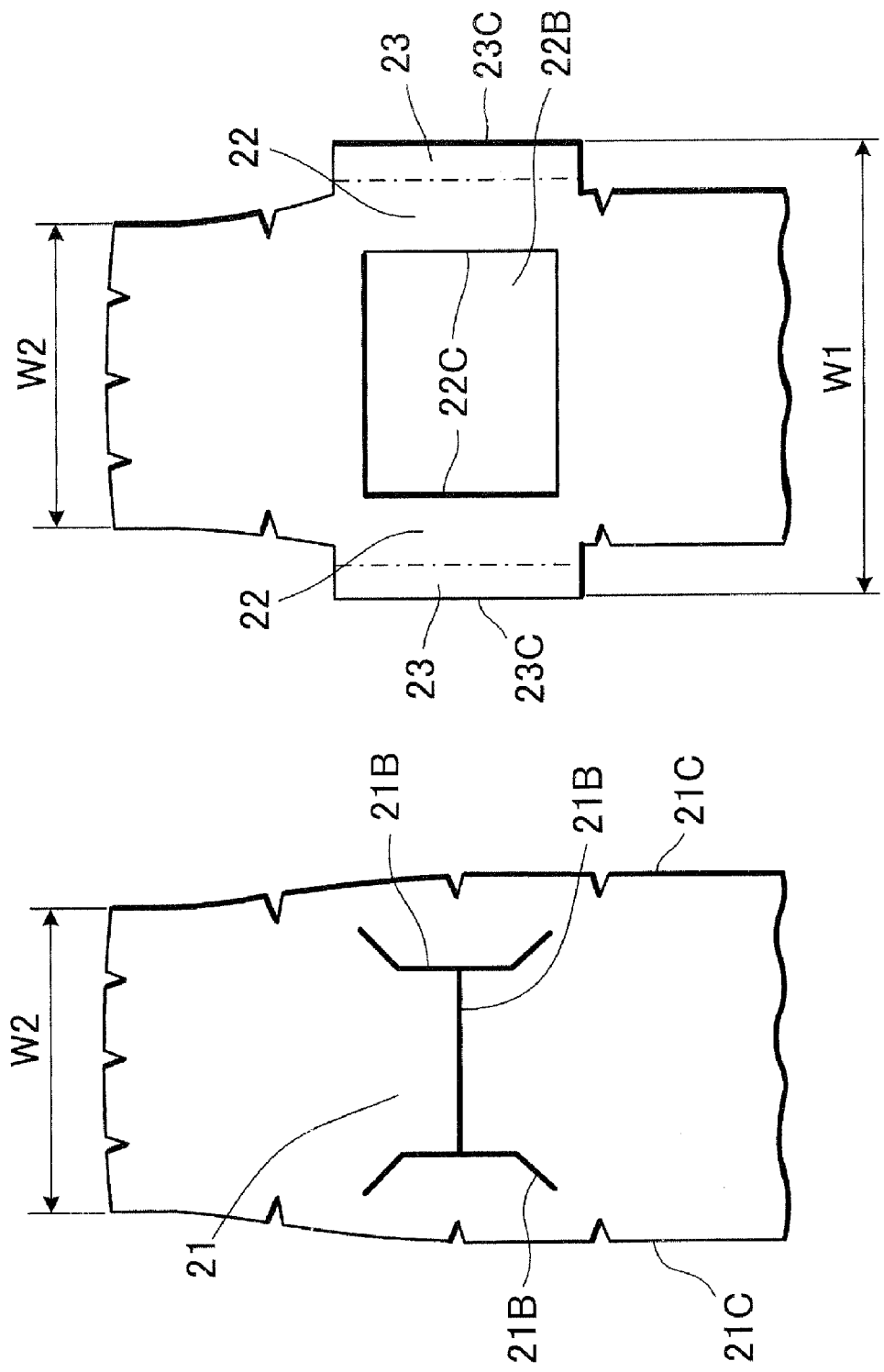
FIG. 5 is a flat view showing a top cover member and a foam wadding, which form an upper cover section of trim cover assembly of the armrest of the present invention.

Referring now to FIG. 5, the top cover member (21) associated with the upper cover section of trim cover assembly is shown on the left side, whereas on the other hand, a foam wadding (22) fixedly laminated with the reverse surface of that top cover member (21) is shown on the right side. Those top cover member (21) and foam wadding (22) are laminated with each other to form the upper cover section of trim cover assembly.

The outer size of the top cover member (21) is substantially equal to that of the foam wadding (22), except that the foam wadding (22) is formed with the above-stated two foam wadding extensions (23) and (23) as shown in the right-side illustration of the FIG. 5. Hence, as shown in the FIG. 5, the width (W2) of the top cover member (21) shown in the left-side illustration is equal to the width (W2) of the foam wadding (22) shown in the right-side illustration, but the latter (22) has a width (W1) larger than the width (W2) defined by adding the two widths respectively of the two foam wadding extensions (23) to the width (W2) of the main body portion thereof.

With regard to the top cover member (21) shown in the left-side illustration of FIG. 5 a pair of longitudinally extending slits (21B) and (21B) are formed therein, with a transversely extending slit (21B) formed between those two slits (21B), so that a generally H-shaped slit (21B) is formed in the top cover member (21). This top cover member (21) has a pair of left-side and right-side lateral ends (21C.)

With regard to the foam wadding (22) shown in the right-side illustration of FIG. 5, a through-hole (22B) is formed therein, which has a pair of left-side and right edges (22C) and (22C). The through-hole (22B) is substantially equal in size to the whole peripheral walls of the cup holder (1).

The whole outer size of the foregoing generally H-shaped slits (21B) formed in the top cover member (21) is substantially equal to the whole outer size of the through-hole (22B). Thus, the cup holder (1) can be inserted through those generally H-shaped slits (21B) and through-hole (22B) into the bore of the foam padding (22) in assembly of the armrest. At that time, though not shown, it is to be seen that the localized areas defined by the slits (21b) in the tom cover member (21) are bent downwardly by the cup holder (1) relative to the corresponding four edges of the through-hole (22b) and retained between the lateral walls of the cup holder (1) and the corresponding wall regions of the bore formed in the foam padding (4) in which the cup holder (1) is received.

The afore-said two lateral ends (22C) and (22C) of trim cover assembly upper cover section are folded as stated previously and sewn by the thread (202) with the two folded end portions respectively of the two lateral cover sections (3) of trim cover assembly.

With the above-described arrangement, as shown in FIG. 4, it is to be appreciated that each of the two foam wadding extensions (23), together with the corresponding region of the localized connecting portion (2), is sandwiched and retained between the cup holder flange (11) and the support member (5), with the result that the localized connecting portion (2) is raised and made protrudent by addition of that foam wadding extension (23) so as to compensate for and eliminate the objectionable recessed portion (H) stated previously. Accordingly, the localized connecting portions (2) closely and neatly contacts a whole peripheral end of the cup holder flange (11) to improve the aesthetic appearance of the upper surface of the armrest (AR), without any objectionable recessed portion (H) created therein.

While having described the present invention, it should be understood that the present invention is not limited to the illustrated embodiment, but any modification, replacement and addition may be applied thereto without departing from the scopes of the appended claims.

What is claimed is:

1. An armrest with a cup holder provided therein, in which said cup holder has a flange, comprising:
   a foam padding having an upper surface and a bore formed in said flange;
   a support member fixedly provided to said foam padding so as to surround a trim cover assembly covering said foam padding, excepting said bore of the foam padding, said trim cover assembly being formed by a foam wadding and a top cover member laminated on said foam wadding; and
   said trim cover assembly including:
      an upper cover section covering said upper surface of said foam padding,
      localized connecting portions (2) defined in said upper surface of the trim cover assembly at points corresponding to said bore of the foam padding, wherein each of said localized connecting portions (2) is folded over to define a folded end portion, and
      a pair of lateral cover sections covering a pair of lateral walls of said foam padding, respectively, said pair of lateral cover sections being connected with said folded end portion of each of said localized connecting portions (2); and
   wherein said folded end portion is sewn so as to define: a first region extending said folded end portion in a direction towards said bore and further extending past said support member; a second region which extends from folded end portion, while underlaying said first region, and rests on said foam padding, such that the folded end portion has two ends that both extend between the support and the distal end of the flange; and an extension which extends from said second region in a direction towards said bore, while underlaying said first region, and further extends past said support member,
   whereupon said first region of said folded end portion is juxtaposed on said extension, thereby forming a lamination of said first region and said extension and said lamination of said first region and said extension rests on and extends past said support member, and
   wherein said cup holder is received in said bore of said foam padding, such that said lamination of said first region and said extension is sandwiched and retained between said flange of said cup holder and said support member, which causes a region of said localized connecting portions between said folded end portion and said flange to be raised upwardly towards a top of said flange of said cup holder.

2. An armrest with a cup holder provided therein, in which said cup holder, comprising:
   a foam padding having an upper surface and a bore formed in said upper surface;
   a support member fixedly provided to said foam padding so as to surround said bore; a trim cover assembly covering said foam padding, excepting said bore foam padding, said trim cover assembly being formed by a foam wadding and a top cover member laminated on said foam wadding; and
   said trim cover assembly including:
      an upper cover section covering said upper surface of said foam padding;
      localized connecting portions (2) defined in said upper surface of the trim cover assembly at points corresponding to said bore of the foam padding; wherein each of said localized connecting portions is folded over to define a folded end portion therein;
      a pair of lateral cover sections covering a pair of lateral walls of said foam padding, respectively, said pair of lateral cover sections being connected with said folded end portion of said each of said localized connecting portions (2); and
   wherein said folded end portion is sewn so as to define:
      a first region extending therefrom in a direction towards said bore and further extending past said support member; and a second region which extends therefrom, while underlaying said first region, and rests on said foam padding,
   a foam wadding extension which extends from said second region in a direction towards said bore, while underlaying said first region, and further extends past said support member,
   whereupon said first region of said folded end portion is juxtaposed on said extension, thereby forming a lamination of first region and said extension and said lamination of said first region and said foam wadding extension rests on and extends past said support member,
   wherein said cup holder is received in said bore of said foam padding, such that said lamination of said first region and said foam wadding extension is sandwiched and retained between a flange of said cup holder and said support member, which causes a region of said localized connecting portions between said folded end portion and said flange to be raised upwardly towards a top of said flange of said cup holder.

* * * * *